June 20, 1972  B. B. HERMAN ET AL  3,671,321
PROCESS FOR PRODUCTION AND TREATMENT OF BATTERY PLATES
Filed Dec. 23, 1969  2 Sheets-Sheet 1
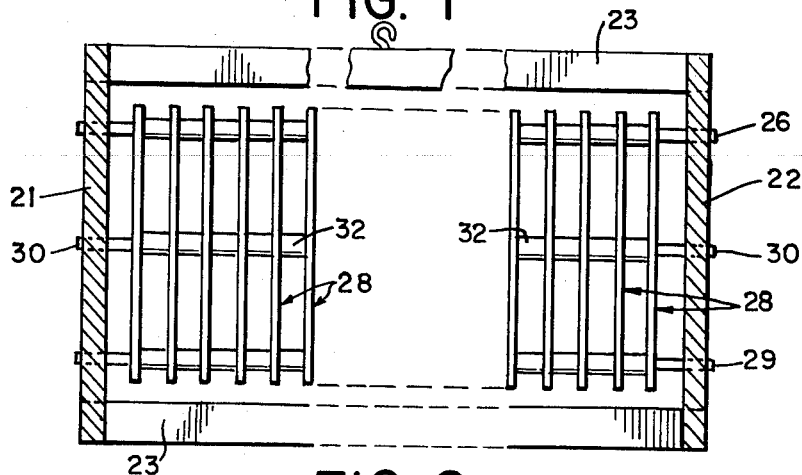
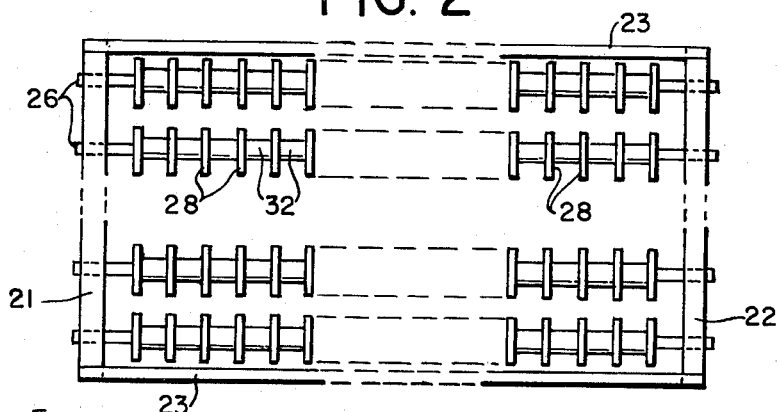
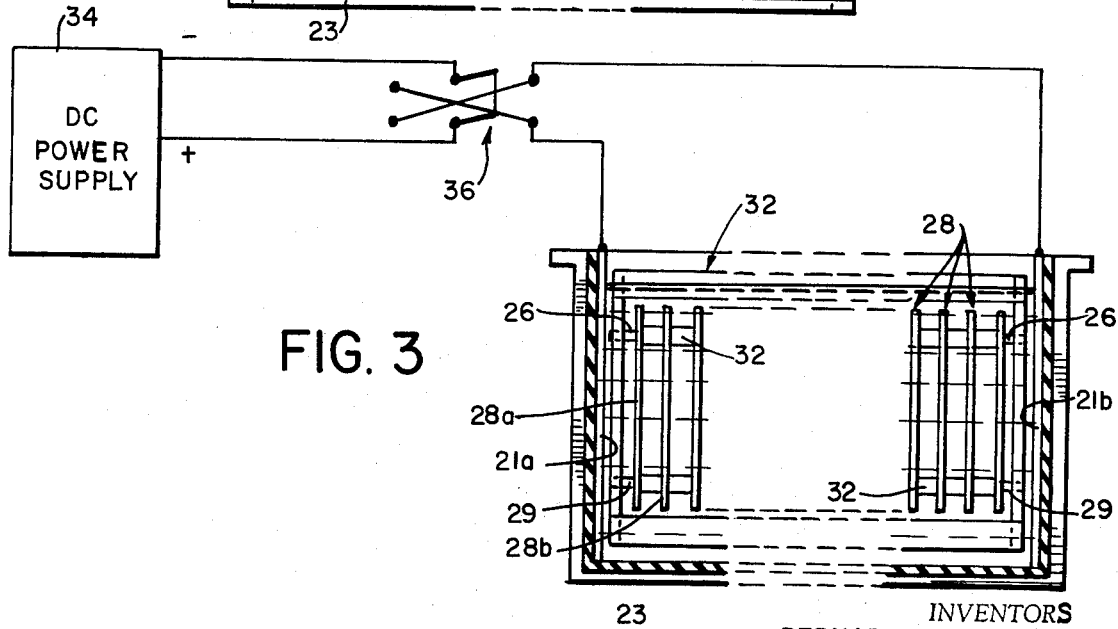
INVENTORS
BERNARD B. HERMAN
VINCENT P. FARLEY, JR.
BY
Darby & Darby
ATTORNEYS

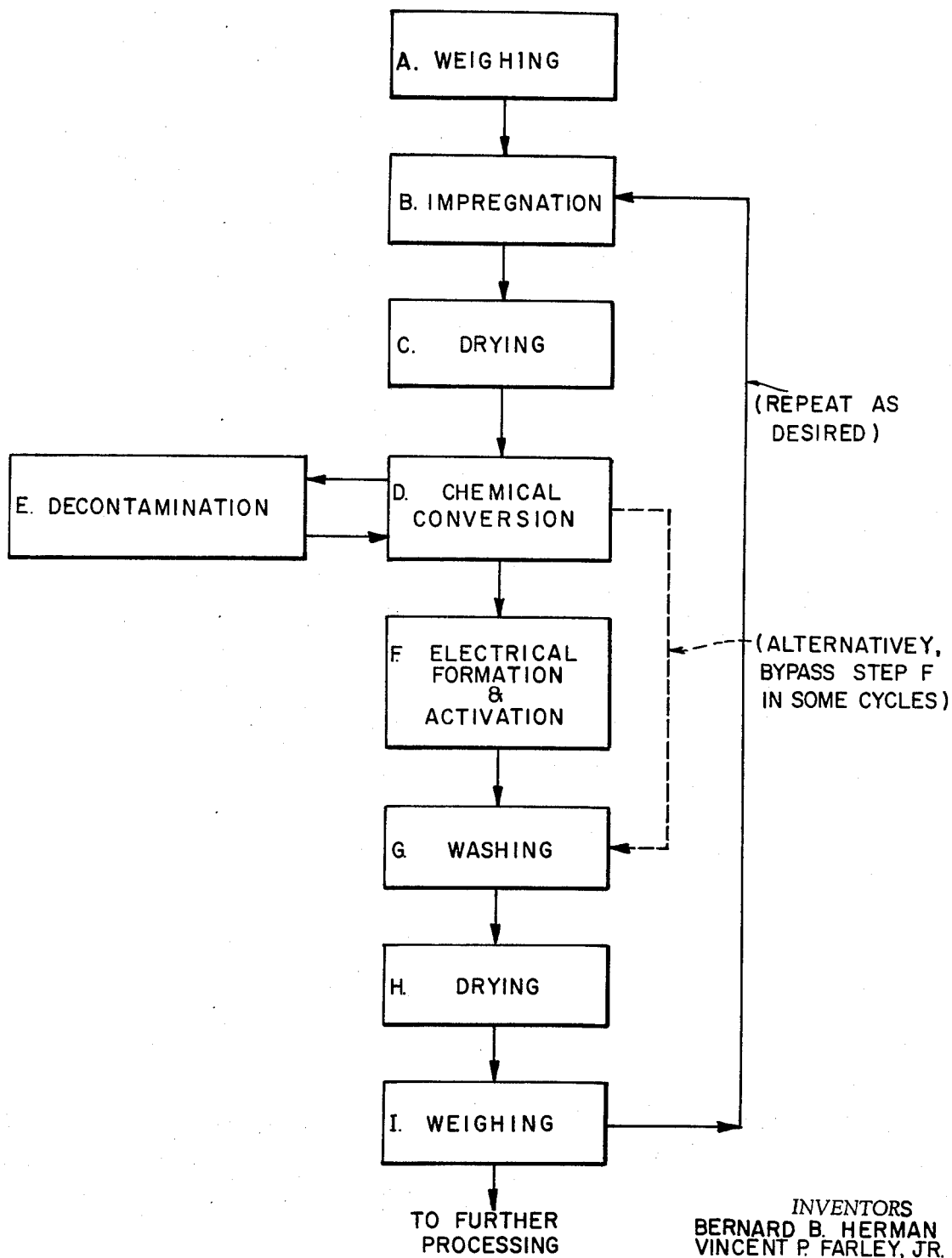

United States Patent Office 3,671,321
Patented June 20, 1972

3,671,321
PROCESS FOR PRODUCTION AND TREATMENT OF BATTERY PLATES
Bernard B. Herman and Vincent P. Farley, Edison, N.J., assignors to Gulton Industries, Inc., Metuchen, N.J.
Filed Dec. 23, 1969, Ser. No. 887,552
Int. Cl. H01m 35/18, 35/30
U.S. Cl. 136—75                    23 Claims

ABSTRACT OF THE DISCLOSURE

A process and apparatus for treatment of battery plates, in which the active material of the plate is electrically formed and decontaminated by electrolyzing without direct connections to a power source, by interposing the active material insulatedly in a bath between two energized electrodes. This is particularly useful in the case of battery plates formed by impregnating a porous substrate with a metallic nitrate and subjecting the impregnated substrate to an alkaline earth hydroxide for formation of active material in the form of a metallic hydroxide.

---

The present invention is directed toward improvements in processes and apparatus for preparing battery plates, particularly for batteries using nickel or cadmium plates, such as nickel-cadmium, nickel-iron, silver-cadmium or other batteries. It is also applicable to lithium, zinc and lead plates.

Its objects are to provide improved electrochemical processes and apparatus therefor by which impurities in the battery plates are reduced, greater porosity of plates is attained, and an original charge is more easily applied, leading to batteries with lower internal impedance, longer shelf-life, lower self-discharge rate, greater charging efficiency, less voltage decline during discharge, and greater number of charge-discharge cycles during the battery life.

These and other objects and advantages are attained while materially reducing the processing time required and while reducing the complexities and costs of handling the plates during processing.

The foregoing will become more clearly apparent from the following description of preferred versions of the present invention, taken in conjunction with the appended drawings in which:

FIG. 1 is a side view of an arrangement for holding battery plate strips during processing.

FIG. 2 is a top view of the arrangement of FIG. 1.

FIG. 3 is a partially diagrammatic view of the arrangement of FIGS. 1 and 2 in association with a processing tank and power supply for electrical treatment of the battery plate strips according to the present invention.

FIG. 4 is a flow diagram of a modified process, using the apparatus of FIGS. 1 to 3.

In the following, the present invention will be specifically described as applied to the production of positive (nickel) plates for alkaline batteries. However, as discussed below, the present process is equally applicable to cadmium and other plates, such as lithium, zinc, silver and lead plates.

In conventional processes for making nickel battery plates, as for alkaline batteries, a porous nickel substrate strip (which after treatment is cut up into separate battery plates) is immersed in a nickel nitrate solution to pick up the nitrate in the substrate pores. After drying, the plate strip is immersed in sodium (or potassium) hydroxide to convert the nitrate into a hydroxide precipitate. After washing to remove excess sodium hydroxide and sodium nitrate produced by the reaction, and then drying, the same steps are repeated until sufficient weight of hydroxide is built up on the substrate.

In this process, the sodium nitrate formed is impossible as a practical matter to be removed entirely. Also, some unconverted nickel nitrate may remain within the pores of the substrate together with sodium nitrate. These nitrates are highly undesirable in the finished battery plate and it is important to keep to a minimum the amount of nitrates which may remain in the plate. Such nitrates are harmful to the life and use of the battery, since they produce a high self-discharge rate, causing a battery to run down from a charged state even while merely resting without use. Also, they create more difficult charging and poorer charging efficiency, requiring more energy to be applied for longer times. The resulting battery has a higher internal impedance, inhibiting its use at low ambient temperatures, and producing a lower output voltage. Hence, steps have to be taken to reduce the amount of this contaminating nitrate material. One common way is by soaking the plate in heated potassium hydroxide, to reduce the sodium nitrate and other impurities and to convert some of the residual nickel nitrate into nickel hydroxide.

The nickel hydroxide thus formed is a bivalent green precipitate and must be activated by conversion to the trivalent black state for use in a battery. This is commonly done by an electrical plate formation or activation process, by forming battery cells with the plate strips as anodes, and passing current through them.

In order to carry out this process in production, the porous nickel substrate is formed as strips of the order of three feet in length and of the order of six inches in width. A large number of these strips are mounted on a frame or basket, in a generally parallel arrangement (in one or more rows or tiers) with sufficient space between the strips for liquid to interact with both faces of each strip. Many strips may then be treated simultaneously, by immersing the entire basket in a suitable tank (e.g. a vacuum tank) to which the appropriate fluids may be conveniently supplied, at required temperatures and pressures.

However, for the electrical activation step, the plates heretofore have had to be made part of electric cells in an electrolyte solution, and electrical connections have had to be made to each plate. To accomplish this, it has been customary, after the substrate strips are impregnated with nickel hydroxide by the sodium hydroxide treatment, to cut the strips into individual plates, which are placed in individual cells, sealed except for a vent. The potassium hydroxide soaking referred to above is accomplished by placing many such cells in a vacuum tank and filling the tank with the required solution, which is allowed to remain, with appropriate heating, for about 24 hours, to reduce the nitrate and other contamination and to insure complete conversion of the nickel nitrate to nickel hydroxide.

However, for the electrical activation, it has been necessary to empty the cells by inverting and draining, and to mount the cells in a fixture in which electrical connection may be made to each cell. Thereafter, electrolyte is added, and activation is carried on by applying appropriate voltages and currents for a period of about 18 hours, converting the green precipitated nickel to the black form, and raising its valency to the trivalent state.

To assure sufficient decontamination and proper activation, the soaking and electrical activation have had to be repeated at least once. The cells have had to be drained, disconnected, and disassembled from the fixture, re-inserted in the vacuum tank, and soaked in potassium hydroxide again, for an additional 24 hours. This has been followed by a second activating period requiring again that the cells be drained, replaced in the fixture and re-connected, refilled with electrolyte, connected again to the electrical source, and allowed to remain for the required activating period of about 18 hours more. In some cases, where the level of impurities has remained excessive, this entire process has had to be repeated, taking an additional 3 to 4 days. The time- and labor-consuming nature of that process is evident.

A similar process is followed for the negative plates, using cadmium nitrate instead of nickel nitrate, to form cadmium plates whose active material is cadmium hydroxide. In the following, the present invention will be exemplified as it applies to nickel plates, although not limited thereto.

The present invention provides a process for making battery plates which produces higher quality plates by reducing the residual contamination (particularly of nitrates and carbonates) and increasing the porosity of the plate, providing greater surface area for interaction with the electrolyte, and lower internal impedance for the battery. The process is also more economical in reducing the previously required period for electrical formation of the plates to less than a few hours, and eliminating the previous necessity to place the plates into cells for application of the electrical energy needed for activating the plates by formation of activated nickel or cadmium.

These advantages have been attained by a new process which simultaneously purifies and activates the plate strips in bulk, without requiring connecting them to any electrical source.

According to one embodiment of the present invention, the same conventional first steps may be used, to impregnate the sintered nickel substrate with hydroxide in conventional manner, leaving a certain amount of contaminating nitrates and carbonates. However, it is preferred to use the impregnating process set forth in our recently filed patent application Ser. No. 887,549 for Battery Plate Treatment Process which shows a process for reducing the amount of such contamination.

Instead of forming the impregnated strips into individual plates and placing them into cells for the electrical activation, as has been customary heretofore, the strips are left in their existing conformation, with many (possibly 200 to 700) strips supported in a single basket or frame, and the subsequent processing is accomplished without removing the strips from their basket. This will become clear from FIGS. 1 and 2, showing one way in which the plate strips may be mounted for ready handling according to the present invention. By way of example, each basket may be formed of two end plates 21 and 22 to which are secured cross-pieces 23 to form a rigid frame. Plates 21 and 22 may be solid sheets or perforated or foraminous in nature. Extending through from one end plate 21 to the other plate 22, and suitably held at each end by the plates 21 and 22 in any desired manner, are a series of rods 26, which in turn support the various battery plate strips 28. In this arrangement these plate strips 28 essentially hang from the top row of rods 26, and are kept in position by a bottom row of rods 29 and, if desired, by one or more intermediate rows of rods 30. This arrangement can be varied as desired; for example, the strips may be disposed with their lengths extending horizontally, and their widths vertical, in several tiers, one above the other. The plate strips 28 are carried in spaced relation on the rods 26, 29 and 30, in any suitable manner, as by means of respective spacers shown at 32. The purpose of spacers 32 is to space the strips 28 to permit the liquid to circulate freely so that the bath in which the basket is placed can chemically interact with all of the strips 28 and on both sides of each strip. Spacings of ½ to ¾ inch are suitable; closer spacings may be used, so long as contact between the strips is divided. Larger spacings are inefficient, in reducing the number of strips which may be processed in a tank of given size.

In the conventional process described above for the initial impregnation of the sintered substrates, the rods 26, 29, 30 and/or the spacers 32, were generally made of suitable metal, such as Monel or stainless steel, which would not be chemically reactive with the bath or the plate strips. However, for purposes which will be described below, according to the present invention, the supports for the plate strips 28 are made of electrically insulating chemically non-reactive material. This would include the braces 23 as well as the rods 26, 28, 30 and the spacers 32. A suitable material is polysulphone.

When impregnating or soaking the plate strips, the entire basket may be lifted and placed in a vacuum tank which is then sealed, and to which the appropriate fluid is then supplied to maintain the plate strips immersed in the bath. Where heat is required, it can be applied to the tank containing the bath, in any suitable manner.

According to the present invention, it is not necessary to disassemble the basket in order to electrically activate the battery plates. This invention dispenses with the steps of making individual cells each containing a plate cut from a plate strip, loading the cells into a vacuum tank, soaking the cells in potassium hydroxide, draining, reassembling in a fixture, refilling with electrolyte and connecting the cells to an electrical power source, previously requiring 3 to 4 days. Instead, according to the present invention, the entire basket, after completing the plate-impregnation cycle, is then simply placed in a tank of electrolyte, and an electrical voltage source is connected only to the end plates 21 and 22. The electrolyte may be potassium hydroxide. However, it has been found that water (preferably de-ionized) may be used, as there is sufficient residual alkali metal hydroxide on the plate strips to create the electrolyte in water.

As an alternate, illustrated in FIG. 3, the two spaced metallic end plates 21a and 21b may be fixed within the tank, and omitted from the basket 32, which would be just a frame carrying the various plate strips, electrically insulated from one another. In this case, the end plates 21a and 21b are permanently coupled to the electrical source 34, and the basket 32 is placed between these end plates 21a and 21b, requiring no electrical connection at all to any part of the basket 32.

It has been discovered that it is unnecessary to connect any of the battery plate strips 28 to the power supply 34, either directly or through other cells as was formerly required. Instead, what is in effect an activating cell is formed between each strip (such as 28a) and its adjoining strip (such as 28b), by electrolytic voltage-dividing action. There is sufficient material in the form of water-soluble salts still remaining in the strips 28 (particularly if the basket is moved while still wet from the chemical conversion bath) to make the medium within the basket an electrolyte. As a result, there is a potential difference between end plate 21 and the adjacent line of strips 28a, a similar potential difference between the line of plate strips 28a and the next line of strips 28b, etc. This potential difference acts in the same way as though a power supply of the same voltage were physically connected between the adjoining plate strips, although the labor of making such connections, previously required in setting up and connecting the cells in a fixture, has been completely eliminated.

Each pair of adjacent plate strips (e.g. 28a and 28b) effectively acts as a cell, with a cathode and an anode, although having no wire connections. The anode is formed by the strip (such as 28a) closer to the positive end plate (say, plate 21) while the cathode is formed by the strip 28b of that same cell closer to the negative end plate (say, plate 22). Each strip (except the end ones) acts as both an anode and a cathode: its surface facing in the direction of the negative end plate 22 (rightward in the figure) acts as an anode, and its other surface facing the positive end plate 21 (leftward in the figure) acts as a cathode. The flow of current from one end plate to the other is by way of each plate strip through the intervening electrolyte to its adjoining strip, accomplishing the required electrical activation of the nickel, by which the green bivalent nickel, of which the plate strips are formed as a result of the impregnating cycle, is converted into the activated black trivalent nickel required for the battery plate. It has been found that electrical activation for a period of the order of 20 minutes will serve essentially to convert all of the green nickel precipitate on the anode faces of the plate strips into the black nickel form. However, the cathode faces of the plate strips are not converted by this action. For example, if the positive terminal of the voltage source is connected to the left end plate 21, as shown in FIG. 3, with the negative terminal connected to the right end plate 22, all of the right-hand surfaces of the plate strips 28 facing the positive end plate will become activated, while none of the left-hand surfaces facing the negative end plate will become activated.

It is a simple matter, however, to complete the activation of the remaining faces of the plate strips 28. This may be done merely by lifting out the basket, rotating it 180°, returning it to the bath, and repeating the process. The portions of the plate strips converted to black nickel formed during the first phase remain as they were, since this conversion is essentially irreversible. However, the charged (trivalent) nickel formed during the first phase is now rapidly discharged to the bivalent form in a few minutes, and continued application of power results in a reverse charge, evidenced by the production of hydrogen gas at this face of the plate strip. The nickel remains in the black form, however. During the second phase, the former cathode faces have become anode faces, and are now activated to the black form and charged to the trivalent form during an equal period of time, of the order of 20 minutes. The completion of the activation can also be simply performed by reversing the polarity of the applied voltage, as by a reversing switch 36.

In addition to accomplishing the required plate activation in this simple and quick way, the present process simultaneously accomplishes certain added functions producing additional important advantages.

By having the potential difference between adjacent plate strips (e.g. between 28a and 28b) exceed the dissociation potential of nitrate ions, contaminating nitrates and carbonates remaining in the plate strips 28 are coverted into ammonia or carbon dioxide gas, which bubbles off and is removed. The plate strips 28 are therefore simultaneously decontaminated electrically, thereby eliminating the necessity of additional steps for nitrate removal and substantially reducing the harmful effects contributed by the previous unavoidable contamination.

The gases thus produced, as well as the hydrogen gas produced on reverse charging, provide an internal scrubbing effect, to remove loose materials and to open the pores of the substrate, thereby increasing the porosity of the plate strip for a given amount of active material. This has a useful effect in lowering the internal impedance and increasing the capacity of the battery.

It is believed that the process just described undergoes the following chemical reactions. At the anode or positive face of each plate strip, the green precipitated nickel is converted to a black form, and the nickel is charged by increasing its valence from bivalent to trivalent, thereby accomplishing the desired activation of the material. This action requires only about 0.9 volt between adjacent strips. By using a voltage in excess of about 2½ volts, the nitrates are dissociated at the cathode or negative face into ammonia gas (with some hydrogen and nitrogen gas) and residual carbonates are dissociated into carbon dioxide gas. These gases are removed by suitable hoods or ventilating apparatus. The voltage difference between each strip pair may be made to be of the order of 3 volts for convenience and assurance of satisfactory operation, in which case some water may also dissociate into hydrogen and oxygen, but this is not harmful. At the same time, the action may convert some of the nickel of the substrate into nickel hydroxide, thereby adding to the available active material in the plate strip.

This action cleans the plate strips of the undesirable residual nitrates without requiring any direct electrical connection to the individual plate strips. At the same time, if any of the pores of the sintered nickel substrate are plugged with nitrate material, such nitrate material is converted to gas, which mechanically agitates and in effect scrubs the internal pores of the plate to wash out the nitrates. This reduces the number of washings otherwise required to eliminate the contaminating nitrates, and increases the porosity of the plate, thereby enhancing the effectiveness of the battery in which the plate is placed by increasing the area of interaction between plate and electrolyte.

The present invention also, for the first time, permits electrical conversion and activation to be performed during each impregnating cycle, while the proper amount of active material is being built up on the plate strips. This accomplishes a higher degree of activation, with less current density and less violent gas production. This arrangement is illustrated in FIG. 4 showing a flow diagram of the steps of such a process.

As previously, the original porous nickel substrate is weighed (step A) to determine the original weight. The substrate is then impregnated with nickel nitrate (step B), and the impregnated substrate is then dried (step C). As before, this produces only a partially impregnated substrate, since insufficient nitrate can be taken up in a single impregnation step.

The partially impregnated substrate then undergoes chemical conversion in a sodium or potassium hydroxide bath (step D), converting the nickel nitrate into nickel hydroxide. By this step the chemical bath in which this chemical conversion takes place is contaminated by reaction products, such as sodium nitrate. The nitrates are preferably removed in the decontamination step E, either continuously during the step C, or sequentially, as described in our copending application for Battery Plate Treatment Process, referred to above. This serves to maintain a low level of nitrate and other contamination in the chemical conversion bath, and thereby enhances the speed and effectiveness of the chemical conversion step.

Instead of going directly to a wash step as previously, the substrate, whose nickel nitrate is now largely converted to nickel hydroxide, is then passed to the electrical conversion step F, which, as described above, simultaneously dissolves and decomposes any residual nitrates while activating the nickel hydroxide. The dissociation of the nitrates into gas reopens the pores of the porous substrate occupied by remaining nickel nitrate, to afford opportunity for further impregnation. Also, any contaminating sodium nitrate remaining on the substrate, is eliminated. Since the bath for the electrical conversion and activation is merely water, this step F can take the place of a washing step. However, further washing may be done at step G, where desired.

This arrangement reduces the number of washings needed, because the electrical dissociation of the nitrates into ammonia gas accompanying the electrical activation accomplishes a washing and scrubbing action of the porous substrate, and produces a battery plate which is therefore chemically more pure and active and can produce higher rates of current during battery operation.

After drying (step H) the substrate is again weighed to determine the accretion of nickel hydroxide, and the cycle beginning at step B is repeated until the desired amount of nickel hydroxide is formed.

In one example, 30 plate strips were placed between the electrodes. A voltage of 40 volts between the electrodes was sufficient to activate the plate strip material on one side. In another example, 14 plate strips were spaced ¾ inch apart, and 42 volts were applied to the end electrodes, passing 20 amperes for 10 minutes, sufficient to convert the nickel hydroxide material.

In another example, 159 substrate strips, each 36 inches long by 6 inches wide, were mounted in three tiers in an insulating rack, with a stack of 53 plates in each tier. After impregnation with nickel nitrate and treatment with potassium hydroxide aqueous solution to convert the nickel nitrate to nickel hydroxide (green, bivalent form), the stacks were placed wet in de-ionized water and electrolyzed at 150 volts and 150 amperes for seven minutes. Thereupon polarity was reversed and the electrolyzing repeated for seven minutes. This resulted in formation and cathodization of clean positive plates by reduction of nitrates with production of ammonia gas.

While in the previous process the electrical formation and activation step was performed during each impregnating cycle, it will be understood that this is not essential. Such a step may be performed each two, three or four cycles, or after all the cycles, or at non-uniform intervals, such as in the first, second, third and last cycles, or other combinations of cycles.

In some cases, after all impregnating cycles and electrical activations are completed, it may be desirable to give the plate strips a final soaking in potassium hydroxide, to eliminate any residual sodium hydroxide or other sodium salts from earlier treatment. This step will normally not be necessary where potassium hydroxide is used for the chemical conversion.

During the electrical activation step, not only is the green precipitated nickel converted to the black form, but the black form is converted to the trivalent state, which is the charged condition for the nickel battery plate. This occurs at the face of the plate strip which is cathodic in nature, while at the other face gaseous by-products of the electrochemical process (principally hydrogen) are formed. When the current is reversed, to activate the latter face, there is essentially a reverse-charge condition; at first the passage of current serves to discharge the already formed trivalent nickel on the first face back to the divalent (discharged) condition, which occurs in the first few minutes of current flow. Thereafter, the same production of gas occurs on that face while on the other face the nickel is converted to the black form and also is charged.

The application of the foregoing process to the cadmium plates is similar. In the case of the cadmium plate, in the discharged condition it is cadmium hydroxide, while in the charged condition it is cadmium metal.

The same weighing step A, impregnation step B (with cadmium nitrate), drying step C and chemical conversion step D by an alkaline earth hydroxide are performed, resulting in precipitated cadmium hydroxide in the substrate.

The electrical formation and activation step serves to charge one face of the substrate by converting it to cadmium metal. The same purification occurs, by converting residual nitrates and carbonates to ammonia and carbon dioxide gas.

The same type of gas scrubbing action occurs with the cadmium plates, by the formation of oxygen gas in the substrate pores, during the conversion of cadmium hydroxide to cadmium metal. Upon current reversal, the opposite face becomes charged while the first face is discharged. Here again, purification occurs. The step may be repeated in any of the patterns discussed above with respect to the nickel plate. In a similar manner, any desired final state of charge is readily attained.

Generally it is desired that the charge on the substrate is kept at zero until the last impregnating cycle. This is readily done by a second reversal of current, just long enough to discharge any remaining charge, as evidenced by the commencement of gas discharge. After the last cycle the charge can be adjusted to any desired value, depending upon the time the substrate is subject to the last current flow. The battery plates thus formed are ready for assembly in a fully sealed cell without further preparation, and any desired degree of charge on either or both plates.

A major advantage of this process is that it permits elimination of the former soaking and cumbersome electrical activation operations which required at least three days. Not only is the time reduced, thereby reducing the amount of equipment and capital investment required, but the plates are improved. Their porosity is markedly increased; for example, where the porosity of the plates was previously about 13%, the present process attains a plate porosity of at least 18% for the corresponding amount of active material, which improves the operation of the battery in that a higher area of active material is permitted to be in contact with the electrolyte, thereby increasing the capacity of the battery and lowering its internal impedance. Each of the battery plates is therefore more chemically pure and is chemically more active, so that higher rates of current are attainable. Greater capacity in ampere-hours is attainable during the discharging cycle of the battery before the battery reaches the usual "knee" of the battery discharge curve at which the voltage diminishes rapidly. Also, the battery provides its full capacity for the entire voltage plateau without the previous marked decline. In addition, the battery is useful in lower temperature environments because of its reduced internal resistance, which previously was a limiting factor for low temperature use. Higher rates of current are attainable because of the lower internal resistance, as well.

The process is far more economical by reducing steps formerly found necessary, and reducing the overall processing steps required and because in addition the present process produces nickel battery plates which may be fully charged, since all of the active material is trivalent nickel hydroxide. It is ready for assembly in a fully sealed cell without further preparation. Similarly, the cadmium plates may be produced with full charge.

For further processing, it is often desirable that these plates be discharged. This is very readily accomplished during the last activation step, according to the present invention, by once more reversing the basket with reference to the tank (or reversing the polarity of the applied voltage) and passing current through the tank, this time for a shorter period of the order of one to two minutes. Any degree of pre-charge of a plate, whether negative or positive, can be attained merely by adjusting the time of the final electrical activation step.

It has sometimes been found desirable in forming battery plates for alkaline batteries, to have the cathode plates slightly charged when assembled into the battery while the anode plates are not charged. This also can readily be accomplished according to the present invention by choosing appropriately the period for the last activating step, in relation to the desired charge.

While the process has been described as applied to plate strips using a porous substrate impregnated with hydroxide, it is not restricted to such plate strips. Other forms of strip may be used, such as pressed plates or others. The present process may also be used to fabricate bipolar battery plates, where there is particular advantage, since both the anode and cathode portions can be formed and charged at the same time.

It will be seen from the above that during the electrical formation, electric current is passed through the bath in which the plate strips are suspended, with the current flowing first in one direction and then in the other, for substantially equal periods. While it may be convenient to have only one current reversal, this is not essential; the current may be reversed several times, and an alternating current may be used, of suitable frequency and duration to accomplish the activation of both surfaces of the plate strips. This, of course, simplifies the apparatus and procedures, since no physical basket reversal or electrical switching is then necessary.

While the present invention has been specifically described with respect to the fabrication of nickel and cadmium plates for alkaline batteries, it is useful also for other plates and batteries. The principles of the invention may be used in the electrical formation of lithium, silver, zinc, lead and other plates, where electrical formation is used.

It will be understood that the present invention has been described only illustratively above, and additional variations and uses will be evident to those skilled in the art. The present invention is defined solely by the appended claims.

What is claimed is:

1. A process for producing battery plates comprising immersing a porous metallic substrate in a solution of a metallic nitrate selected from the class consisting of nickel nitrate and cadmium nitrate, drying said substrate leaving said nitrate thereon, immersing said dried substrate in an aqueous solution of an alkaline earth hydroxide thereby converting said nitrate into a metallic hydroxide, then transferring said substrate while still wet to a bath of de-ionized water between two electrodes, maintaining said substrate electrically insulated from said electrodes except through said bath, and passing current through said bath between said electrodes to form said plate.

2. A process as in claim 1 further including reversing the direction of current flow after a predetermined period of time.

3. A process as in claim 1 wherein the voltage between said electrodes is sufficient to cathodize residual nitrates into ammonia gas.

4. A process as in claim 1 wherein the voltage between said electrodes is greater than 0.8 volt.

5. A process as in claim 1 wherein the voltage between said plates is greater than the dissociation voltage of nitrate ions.

6. In a process for treatment of battery plates in which a porous substrate is impregnated with a metallic nitrate and subjected to an alkaline earth hydroxide for formation of active material in the form of a metallic hydroxide, the improvement comprising immersing at least one of such plates electrically insulated from any other such plates in a liquid between two electrodes, and passing electric current between said electrodes.

7. A process as in claim 6 wherein said liquid is water.

8. A process as in claim 7 wherein said liquid comprises substantially de-ionized water.

9. A process as in claim 8 wherein said metallic hydroxide is nickel hydroxide.

10. A process as in claim 6 wherein said liquid is an aqueous solution of an alkaline earth hydroxide.

11. A process as in claim 6 further including the step of reversing the direction of flow of said current after a predetermined time.

12. A process as in claim 6 wherein said metallic hydroxide is nickel hydroxide.

13. A process as in claim 6 wherein said metallic hydroxide is cadium hydroxide.

14. A process as in claim 6 including the step of applying a voltage to pass said current to said electrodes sufficient to dissociate nitrate and carbonate ions at each of such insulated plates.

15. A process for treatment of a battery plate comprising the step of immersing said plate in a liquid between two electrodes while maintaining said plate insulated from both said electrodes, passing an electric current through said liquid from one electrode to the other, and removing said treated battery plate from said liquid after said current has been cut off.

16. A process as in claim 15 wherein said plate comprises a material selected from the group consisting of nickel and cadmium hydroxide.

17. A process as in claim 16 comprising the step of wetting said plate with an alkaline earth hydroxide before said immersion into said liquid.

18. A process as in claim 17 wherein said liquid is water.

19. A process as in claim 18 wherein said liquid is water which has been substantially de-ionized.

20. A process as in claim 15 wherein said plate comprises a material selected from the group consisting of divalent nickel hydroxide, trivalent nickel hydroxide, cadmium hydroxide and cadmium.

21. A process as in claim 15 wherein said current is passed by applying a sufficient voltage between said electrodes for dissociating nitrate and carbonate ions on said plate into gases, whereby nitrate and carbonate impurities are removed and said plate is cleaned and its porosity increased by action of said gases.

22. In a method of processing battery plates the step of continuously removing impurities from said plates including electrically treating said plates in bulk by immersing said plates in an electrolyte, and passing current through said electrolyte independently of said plates.

23. A process as in claim 22 comprising the further step of maintaining said plates insulated from each other and from the source of said current.

References Cited

UNITED STATES PATENTS

| | | | |
|---|---|---|---|
| 1,269,078 | 6/1918 | Hamilton | 204—269 |
| 2,899,480 | 8/1959 | Fleischer | 136—67 |
| 3,061,537 | 10/1962 | Yagishita | 204—275 |
| 3,324,023 | 6/1967 | Kircher | 204—256 |
| 3,281,272 | 10/1966 | Ackermann et al. | 136—29 |
| 3,457,151 | 7/1969 | Kortejarvi | 204—130 |

ANTHONY SKAPARS, Primary Examiner

U.S. Cl. X.R.

136—76, 78